United States Patent

Ikeda et al.

Patent Number: 5,572,877
Date of Patent: Nov. 12, 1996

[54] AIR CONDITIONER FOR VEHICLES

[75] Inventors: Susumu Ikeda; Toshimi Isobe, both of Isesaki; Akihiro Tajiri, Wako; Mitsuru Ishikawa, Wako; Choji Sakuma, Wako; Nobuyuki Yuri, Wako, all of Japan

[73] Assignees: Honda Giken Kogyo Kabushiki Kaisha, Tokyo; Sanden Corporation, Gunma, both of Japan

[21] Appl. No.: 477,920

[22] Filed: Jun. 7, 1995

[30] Foreign Application Priority Data

Jul. 6, 1994 [JP] Japan ................................. 6-155032

[51] Int. Cl.⁶ ........................... F25D 21/06; B60S 1/54
[52] U.S. Cl. ........................ 62/155; 62/231; 165/232; 454/121
[58] Field of Search ....................... 454/75, 121; 62/90, 62/231, 155; 165/43, 17

[56] References Cited

U.S. PATENT DOCUMENTS

| | | | |
|---|---|---|---|
| 4,412,424 | 11/1983 | Iida et al. | 454/121 X |
| 4,709,751 | 12/1987 | Ichimaru et al. | 454/121 X |
| 4,730,662 | 3/1988 | Kobayashi | 165/17 X |

*Primary Examiner*—William E. Wayner
*Attorney, Agent, or Firm*—Lyon & Lyon

[57] ABSTRACT

An air conditioner for vehicles can operate at a dehumidifying-operation mode including at least a dry-cooling or a dry-heating mode. The air conditioner comprises a plurality of discharge ports including a defroster discharge port and discharge port switching dampers, a control system for opening at least the defroster discharge port for a predetermined time when the dehumidifying-operation mode is selected, and a control system for opening another discharge port determined in accordance with an operation mode and the like after the predetermined time has elapsed. When the dehumidifying operation is selected, at least the defroster discharge port is opened only for the predetermined time and temperature-conditioned air is discharged to the windshield from the defroster discharge port. After the predetermined time has elapsed, a discharge port in accordance with an operation mode is opened. Traveling safety can be increased by removing the cloud of moisture from the windshield at first in the environment of a dehumidifying operation, that is, in the environment that the humidity in the interior of the vehicle is high and the windshield is likely to be clouded up. The troublesome job of manually selecting the defroster discharge port to remove the cloud of moisture becomes unnecessary.

7 Claims, 4 Drawing Sheets

AIR CONDITIONER FOR VEHICLES

BACKGROUND OF THE INVENTION

1. Field of the Invention

The present invention relates to an air conditioner for vehicles capable of performing a dehumidifying operation such as dry cooling, dry heating and the like.

2. Description of the Related Art

This type of air conditioner for a vehicle can perform a dehumidifying operation for removing water from intake air and discharging the dehumidified air into the interior of the vehicle, in addition to a cooling and heating operation for cooling or heating the intake air by a heat exchanger and discharging the cooled or heated air into the interior of the vehicle. The dehumidifying operation includes various modes such as dry-cooling mode, dry-heating mode and the like in which cooling of air and heating of air are performed together.

Although the dehumidifying operation is often selected in an environment where the humidity in the interior of the vehicle is high and the windshield is liable to be clouded with moisture, there is a problem that even if the dehumidifying operation is started, a considerable time is required before the moisture on the windshield is removed and the field of vision is temporarily lowered during that time.

Further, although there is a practice that a user resets the open discharge port to a defroster discharge port when the dehumidifying operation is started, it is troublesome to reset it each time the dehumidifying operation is started, and this is not a preferable method to be carried out in the state that the field of vision is lowered.

SUMMARY OF THE INVENTION

It is an object of the present invention to provide an air conditioner for vehicles which can remove the cloud of moisture on the interior of a windshield immediately after the start of the dehumidifying operation.

To accomplish the above object, an air conditioner for vehicles according to the present invention can operate at a dehumidifying-operation mode including at least a dry-cooling or dry-heating mode. The air conditioner comprises a plurality of discharge ports including a defroster discharge port and discharge port switching means such as dampers; a defroster discharge port opening means for opening at least the defroster discharge port for a predetermined time when the dehumidifying-operation mode is selected; and a first discharge port return means for opening another discharge port determined in accordance with an operation mode of the air conditioner and the like after the predetermined time has elapsed.

In such an air conditioner, when the dehumidifying operation is selected, at least the defroster discharge port is opened only for the predetermined time and temperature-conditioned air is discharged to the windshield from the defroster discharge port. After the predetermined time has elapsed, another discharge port in accordance with an operation mode of the air conditioner is opened. Therefore, traveling safety can be increased by removing the cloud of moisture from the windshield first in the environment that a dehumidifying operation is selected, that is, in the environment that the humidity in the interior of the vehicle is high and the windshield is liable to be clouded up. Further the troublesome job of manually selecting the defroster discharge port to remove the cloud of moisture can be made unnecessary.

In the air conditioner, a second discharge port return means may be further provided for opening a discharge port determined in accordance with an operation mode of the air conditioner and the like when the selected dehumidifying-operation mode is cancelled before the predetermined time elapses. Furthermore, a third discharge port return means may be further provided for opening a discharge port determined in accordance with a request issued when a discharge port other than the defroster discharge port is required before the predetermined time elapses.

In such a system, when the selected dehumidifying-operation mode is cancelled or when a discharge port other than the defroster discharge port is required before the predetermined time elapses, a discharge port can be immediately opened in accordance with an operation mode of the air conditioner, the request and the like. As a result, a discharge port can be quickly switched in response to the request for changing an operation mode of the air conditioner, the request for opening a discharge port and the like, and thus operability can be greatly improved.

Further objects, features, and advantages of the present invention will be understood from the detailed description of the preferred embodiment of the present invention with reference to the appropriate figures.

BRIEF DESCRIPTION OF THE DRAWINGS

A preferred exemplary embodiment of the invention will now be described with reference to the appropriate figures, which is given by way of example only, and is not intended to limit the present invention.

DETAILED DESCRIPTION OF THE PREFERRED EMBODIMENT

Figure 1:
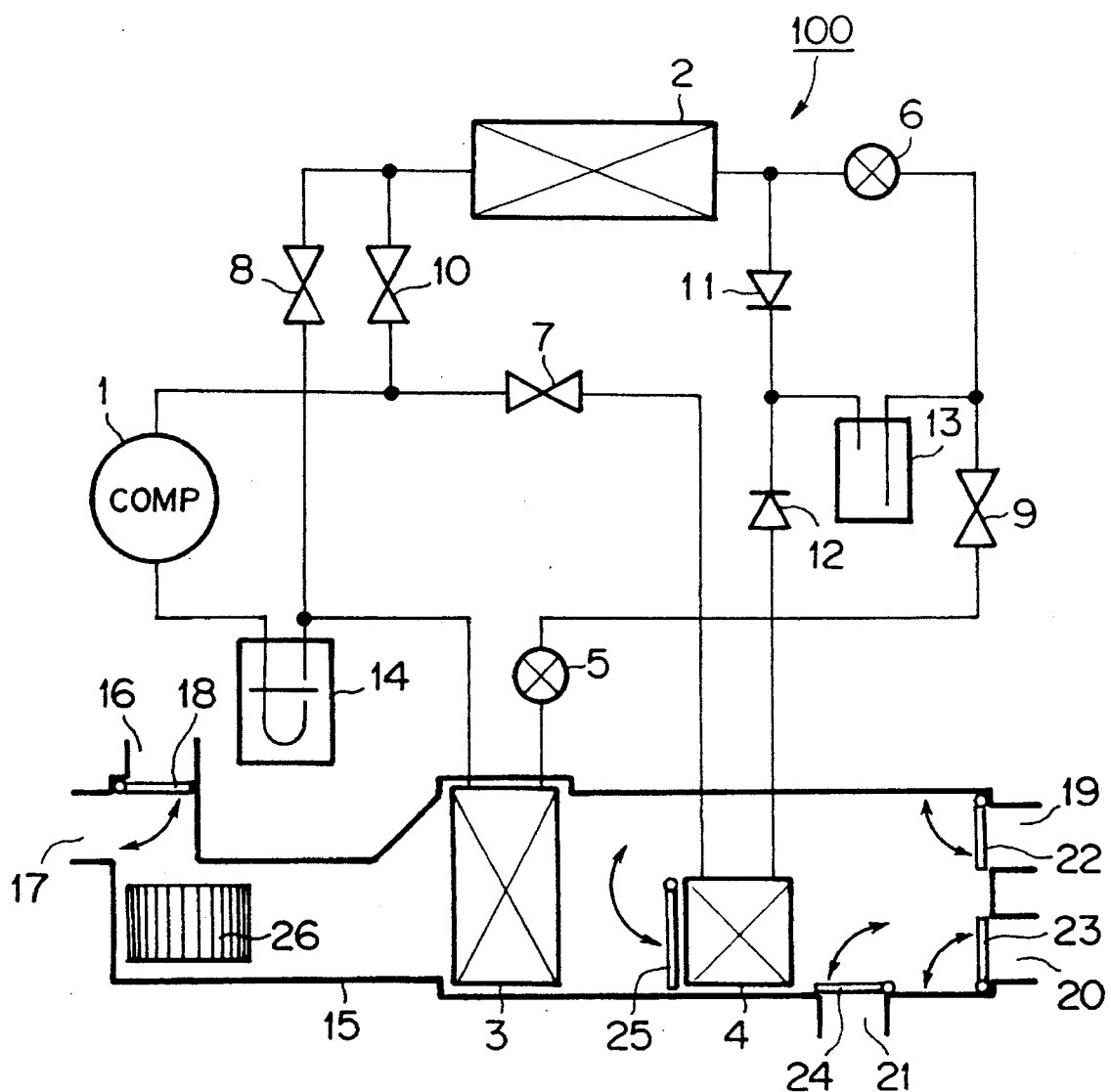
FIG. 1 is a schematic view including a refrigerant circuit diagram of an air conditioner for vehicles according to an embodiment of the present invention.
Figure 2:
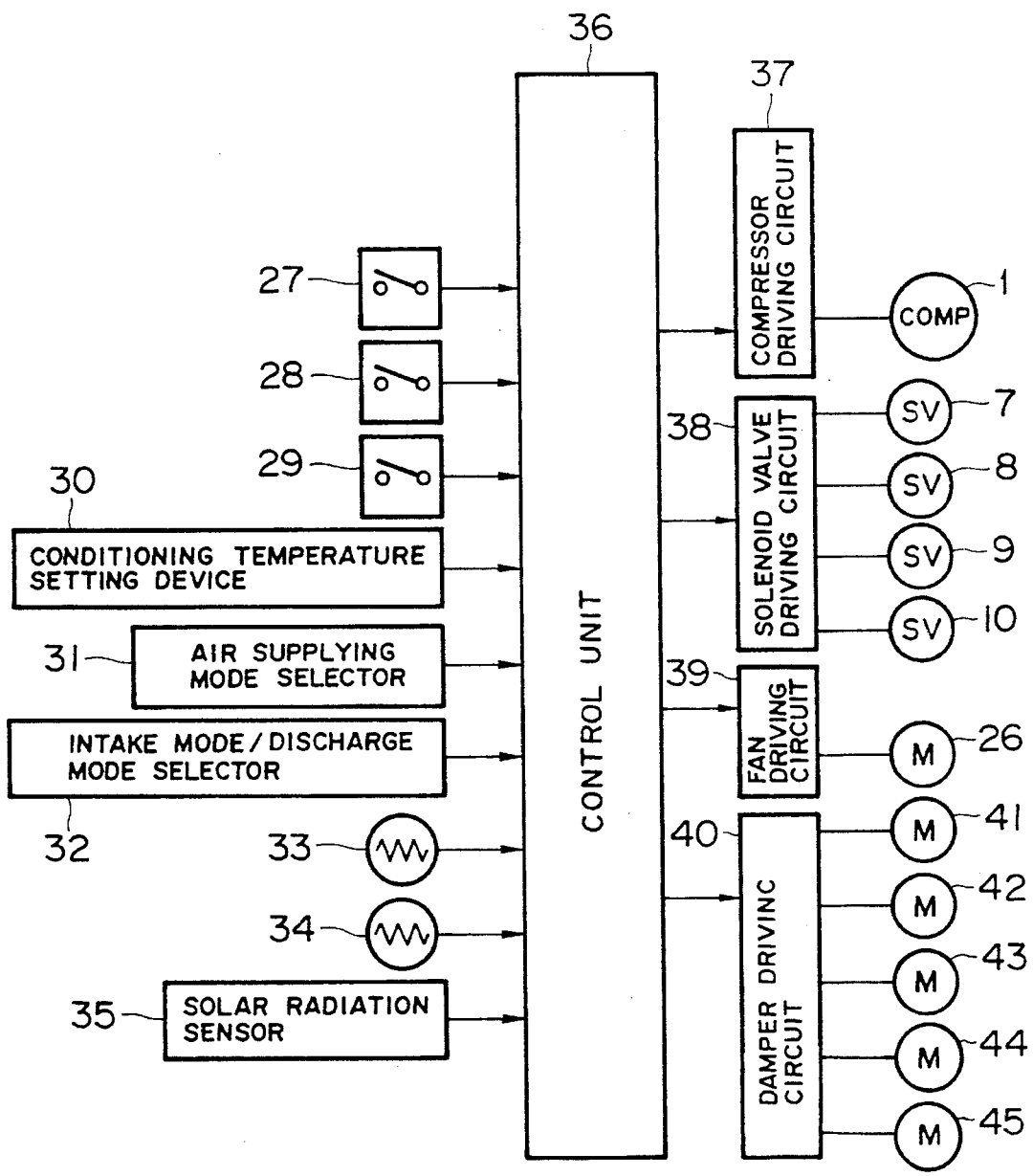
FIG. 2 is a block diagram of a control circuit of the air conditioner shown in FIG. 1.

Referring to FIGS. 1 and 2, an air conditioner for a vehicle having a heat pump type refrigerant circuit is provided according to an embodiment of the present invention. Air conditioner 100 includes a variable displacement motor compressor 1, an external heat exchanger 2 provided outside of a duct 15 through which the air for air conditioning is supplied to an interior of the vehicle, and a first internal heat exchanger 3 and a second internal heat exchanger 4 provided inside of the duct 15.

The discharge port of compressor 1 is connected to one port of external heat exchanger 2 via a fourth solenoid valve 10, and the other port of the external heat exchanger 2 is connected to the inlet of a receiver 13 via a first check valve 11. The outlet of receiver 13 is connected to one port of first internal heat exchanger 3 via a third solenoid valve 9 and a first expansion valve 5. The other port of the first internal heat exchanger 3 is connected to the inlet of an accumulator 14, and the outlet from the accumulator 14 is connected to the suction port of compressor 1.

Further, the discharge port of compressor 1 is connected to one port of the second internal heat exchanger 4 via a first solenoid valve 7, and the other port of the second internal heat exchanger 4 is connected to the inlet of receiver 13 via a second check valve 12. A second expansion valve 6 is provided between the outlet of receiver 13 and the other port of external heat exchanger 2. A second solenoid valve 8 is provided between one port of external heat exchanger 2 and the inlet of accumulator 14.

Duct 15 has an outside-air intake port 16 and an inside-air intake port 17. The balance between outside air and inside air to be drawn into duct 15 is adjusted by a switching damper 18. A motor fan 26 is provided in duct 15 as air supplying means for supplying the intake air to the interior of the vehicle. In duct 15, the first internal heat exchanger 3 and the second internal heat exchanger 4 are arranged in this order in the flow direction of air, and an air mixing damper 25 is provided immediately upstream of the second internal heat exchanger 4.

The discharge ports of duct 15 comprise a vent discharge port 19, a foot discharge port 20 and a defroster discharge port 21. A damper 22 opens and closes vent discharge port 19, a damper 23 opens and closes foot discharge port 20 and a damper 24 opens and closes defroster discharge port 21.

FIG. 2 shows a control circuit for the above-described air conditioner. An air conditioner switch 27, an automatic switch 28, a dry switch 29, a conditioning temperature setting device 30, an air supplying mode selector 31 for selecting an air supplying mode and a selector 32 for selecting intake and discharge modes are connected to a control unit 36 (such as a microcomputer). Air conditioner switch 27 initiates the operation of the air conditioning. Automatic switch 28 switches the selection of the intake ports and the discharge ports for the control due to the microcomputer (control unit 36). Dry switch 29 is provided for requiring a dehumidifying operation. Conditioning temperature setting device 30 has a lever or buttons for setting an air temperature to be controlled, and the temperature for air conditioning can be appropriately selected and set by the operation of the conditioning temperature setting device 30. Air supplying mode selector 31 has a variable lever capable of changing the volume of air and capable of selecting an "OFF" position and an "AUTO" position (automatic control mode). The air volume can be changed in multiple stages or continuously by the operation of the variable lever, and the air volume can be automatically controlled by control unit 36 when the lever is switched to the position of "AUTO".

Intake mode/discharge mode selector 32 includes an inside air switch and an outside air switch for selecting the intake ports, and a vent switch, a foot switch and a defroster switch for selecting the discharge ports, and the intake ports and the discharge ports can be appropriately selected and set by operating these switches. More specifically, when the automatic switch 28 or the dry switch 29 is turned ON, the setting manually effected through the intake mode/discharge mode selector 32 is ignored and the intake ports and the discharge ports are automatically selected by control unit 36.

The signals from a temperature sensor 33 for detecting the temperature of inside air comprising, for example, a thermister, a temperature sensor 34 for detecting the temperature of outside air comprising, for example, a thermister, and a solar radiation sensor 35 such as a photosensor are sent to control unit 36.

Control unit 36 has a CPU, ROMs, RAMs, etc., and programs for the determination of operation modes, the control of the rotational speed of compressor 1 and the control of switching conditions of the solenoid valves as well as a program for the control of switching of discharge ports described later are stored in the ROMs. This control unit 36 sends control signals to a compressor driving circuit 37, a solenoid valve driving circuit 38, a fan driving circuit 39 and a damper driving circuit 40, respectively, in response to the operation signals of air conditioner switch 27, automatic switch 28, dry switch 29, conditioning temperature setting device 30, air supplying mode selector 31 and intake mode/discharge mode selector 32 and the detected signals of temperature sensors 33 and 34 and solar radiation sensor 35. Compressor driving circuit 37 controls the rotational speed of compressor 1 in response to the rotational-speed signal sent from control unit 36 to control the output of the compressor 1. Solenoid valve driving circuit 38 controls the opening and closing operations of the respective solenoid valves 7 to 10 in response to the mode signals sent from control unit 36 for switching the refrigerant cycle in the refrigerant circuit. Fan driving circuit 39 controls the volume of air supplied by motor fan 26 in response to the air volume signal sent from control unit 36.

Damper driving circuit 40 controls electric power supplied to respective damper motors 41, 42 and 43 driving the respective dampers 22, 23 and 24 based on the discharge mode signals sent from control unit 36. Similarly switching damper 18 for the intake ports and air mixing damper 25 are also controlled by damper motors 44 and 45, respectively, and driving circuit 40.

The air conditioner can selectively operate among four modes, i.e., a cooling mode, a dry cooling mode, a heating mode and a dry heating mode can be selected. The cooling mode and the heating mode are automatically determined by control unit 36 based on the set temperature, detected values of inside air, outside air, solar radiation and the like, and the dry cooling mode and the dry heating mode are determined based on the operational condition of dry switch 29.

In the operation of the cooling mode, the first and second solenoid valves 7 and 8 are closed and the third and fourth solenoid valves 9 and 10 are opened. In such a condition, compressor 1 and motor fan 26 are driven. The refrigerant discharged from compressor 1 flows to external heat exchanger 2 through the fourth solenoid valve 10 and is condensed therein by the heat radiating action. The condensed refrigerant flows to the first expansion valve 5 and the first internal heat exchanger 3 through the first check valve 11, the receiver 13 and the third solenoid valve 9 and is evaporated therein by the heat absorbing action. The evaporated refrigerant then flows through accumulator 14 to compressor 1.

In this cooling mode, the cooling of the interior of the vehicle can be performed by utilizing the heat absorbing action in the first internal heat exchanger 3.

In the operation of the dry cooling mode, the first, third and fourth solenoid valves 7, 9 and 10 are opened and the second solenoid valve 8 is closed, and in such a condition, compressor 1 and motor fan 26 are driven. A portion of the refrigerant discharged from compressor 1 flows to external heat exchanger 2 through the fourth solenoid valve 10 and is condensed therein by the heat radiating action. The condensed refrigerant flows to the first expansion valve 5 and the first internal heat exchanger 3 through the first check valve 11, the receiver 13 and the third solenoid valve 9 and is evaporated therein by the heat absorbing action, and the evaporated refrigerant is drawn into the compressor 1 through accumulator 14. The remaining portion of the refrigerant discharged from compressor 1 flows to the second internal heat exchanger 4 through the first solenoid valve 7 and is condensed therein by the heat radiating action, and this portion of the condensed refrigerant joins the above-described portion of the refrigerant after passing through the second check valve 12.

In this dry cooling mode, the heat absorbing action in the first internal heat exchanger 3 and the heat radiating action in the second internal heat exchanger 4 are both utilized, and the dehumidification of the interior of the vehicle can be performed without being accompanied by a drop of the temperature of the discharge air. Further, at that time, the temperature and the amount of dehumidification can be controlled by adjustment of the discharge capacity of compressor 1 and adjustment of the opening degree of air mixing damper 25. The ratio of the flow rate in the refrigerant flow path to the second internal heat exchanger 4 to the flow rate in the refrigerant flow path to the external heat exchanger 2 varies in accordance with change in opening degree of air mixing damper 25 (that is, the volume of air passing through the second internal heat exchanger 4). As a result, the balance between the heat absorbing action in the first internal heat exchanger 3 and the heat radiating action in the second internal heat exchanger 4 and the external heat exchanger 2 is properly maintained. Specifically, when the opening degree of air mixing damper 25 approaches zero, that is, when the volume of air passing through the second internal heat exchanger 4 approaches zero, a percentage of the flow rate to the external heat exchanger 2 approaches to a maximum value, so that the heat radiating action in the external heat exchanger 2 shifts to a greater amount side.

In the operation of the heating mode, the first, second and third solenoid valves 7, 8 and 9 are opened and the fourth solenoid valve 10 is closed, and in such a condition, compressor 1 and motor fan 26 are driven. The refrigerant discharged from compressor 1 flows to the second internal heat exchanger 4 through the first solenoid valve 7 and is condensed therein by the heat radiating action. The condensed refrigerant is diverged after passing through the second check valve 12 and receiver 13, and one portion of the diverged refrigerant flows to the first expansion valve 5 and the first internal heat exchanger 3 through the third solenoid valve 9 and is evaporated therein by the heat absorbing action, and then the evaporated refrigerant is drawn into compressor 1 through accumulator 14. The other portion of the diverged refrigerant flows to the second expansion valve 6 and external heat exchanger 2 and is evaporated therein by the heat absorbing action, and this portion of the evaporated refrigerant joins the above-described portion of the refrigerant at the inlet to accumulator 14 after passing through the second solenoid valve 8.

In this heating mode, the interior of the vehicle can be heated by utilizing the radiating action in the second internal heat exchanger 4 as well as the interior of the vehicle can be dehumidified by utilizing the heat absorbing action in the first internal heat exchanger 3. Further, at that time, the heating ability and the amount of dehumidification can be controlled by adjustment of the discharge capacity of compressor 1 and adjustment of the opening degree of air mixing damper 25.

In the operation of the dry heating mode, the first and third solenoid valves 7 and 9 are opened and second and the fourth solenoid valves 8 and 10 are closed, and in such a condition, compressor 1 and motor fan 26 are driven. The refrigerant discharged from compressor 1 flows to the second internal heat exchanger 4 through the first solenoid valve 7 and is condensed therein by the heat radiating action. The condensed refrigerant flows to the first expansion valve 5 and the first internal heat exchanger 3 through the second check valve 12, the receiver 13 and the third solenoid valve 9 and is evaporated therein by the heat absorbing action, and then the evaporated refrigerant is drawn into compressor 1 through accumulator 14.

In this dry heating mode, the interior of the vehicle can be heated by utilizing the radiating action in the second internal heat exchanger 4 as well as the interior of the vehicle can be dehumidified by utilizing the heat absorbing action in the first internal heat exchanger 3. Further, at that time, the heating ability and the amount of dehumidification can be controlled by adjustment of the discharge capacity of compressor 1 and adjustment of the opening degree of air mixing damper 25.

Figure 3:
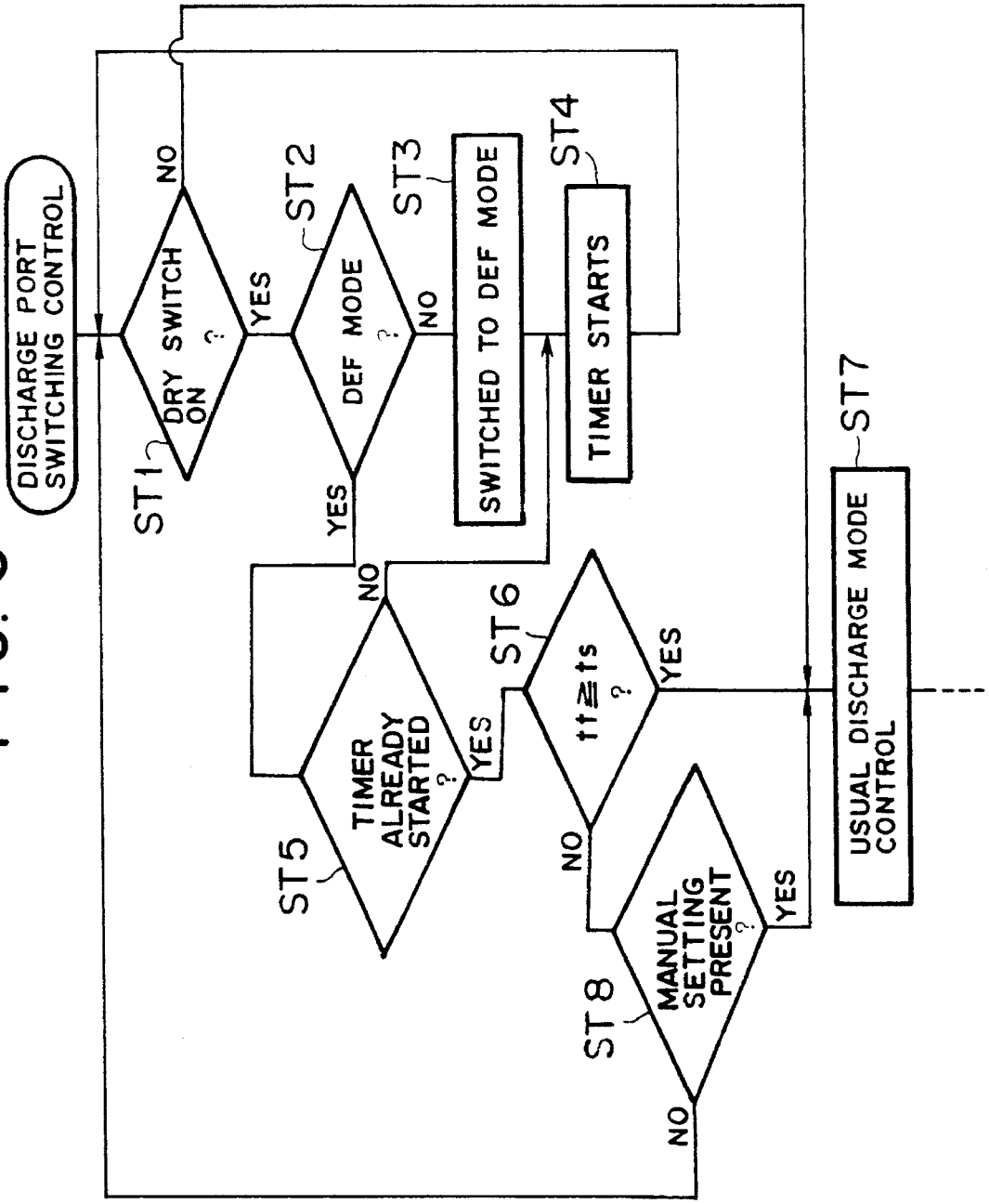
FIG. 3 is a flowchart showing control for switching discharge ports in the air conditioner shown in FIG. 1.

Next, the control of switching of the discharge ports performed in the above-described air conditioner will be explained in detail with reference to FIG. 3 showing an example of a program flow for the control.

Whether the dry switch 29 is turned ON or OFF is monitored at all times while the air conditioner is operated, and when the dry switch 29 is turned ON (step ST1), it is determined whether a present discharge mode is a DEF mode (defroster mode) or not (step ST2).

When the present discharge mode is not the DEF mode, damper 24 is driven to open defroster discharge port 21 and a timer, which may be equipped within the control unit 36, is started in order to continue the open condition of the defroster discharge port 21 for a predetermined time "ts" for example, about three minutes (steps ST3 and ST4). Alternatively, when the present discharge mode is the DEF mode (YES in step ST2), it is determined whether the timer has been already started (step ST5). When the timer has not been started, the flow proceeds to step ST4 and the timer is started. When the timer has been already started (YES in step ST5), it is determined whether the time "tt" of the timer has elapsed as compared with the predetermined time "ts" at step ST6. After the time "ts" has elapsed, the mode control is subjected to a usual control for discharge modes, and a predetermined discharge port is opened in accordance with an operation mode, or the like (step ST7). Further, when dry switch 29 is turned OFF (step ST1) or a discharge port other than defroster discharge port 21 is manually set by intake mode/discharge mode setting device 32 before the time "ts" elapses, the usual discharge mode control is also executed and a predetermined discharge port is opened in accordance with an operation mode, a setting effected manually and the like (step ST8).

As described above, in the air conditioner for vehicles, when dry-cooling mode or dry-heating mode is selected as an operation mode, temperature-conditioned air is discharged to the windshield by fixing the discharge port selection to defroster discharge port 21 for the predetermined time "ts". Therefore, the cloud of moisture on the windshield is removed immediately in the environment that the dry-cooling mode or the dry-heating mode is selected, i.e., in the environment that the humidity in the interior of the vehicle is high and the windshield is likely to be clouded up with moisture, and traveling safety can be increased by the removal of the cloud of moisture. Further, the troublesome job of manually selecting the defroster discharge port 21 to remove the cloud of moisture is unnecessary.

Further, when the selection of the dry-cooling mode and the dry-heating mode is cancelled before the predetermined time "ts" elapses or when a discharge port other than defroster discharge port 21 is manually set, a discharge port can be immediately opened in accordance with an operation mode, a setting effected manually and the like. As a result, operability can be greatly improved in such a manner that the discharge port is quickly switched in response to the request for changing an operation mode, the request for opening a discharge port and the like.

Although the modes of the dry cooing and the dry heating, i.e., except for the cooling and heating modes, are determined based on the operating condition of the dry switch 29 in the above embodiment, it may be possible that a user selects and sets all the operation modes through an operation mode setting device including respective switches and the microcomputer reads the set state, or the microcomputer may determine all the operation modes.

Further, although the above description relates to the case where the temperature-conditioned air is entirely discharged to the windshield, it may be possible that a portion of temperature-conditioned air is supplied to the defroster discharge port and the remaining air is supplied to the vent discharge port, the foot discharge port and the like in accordance with an operation mode.

Figure 5:
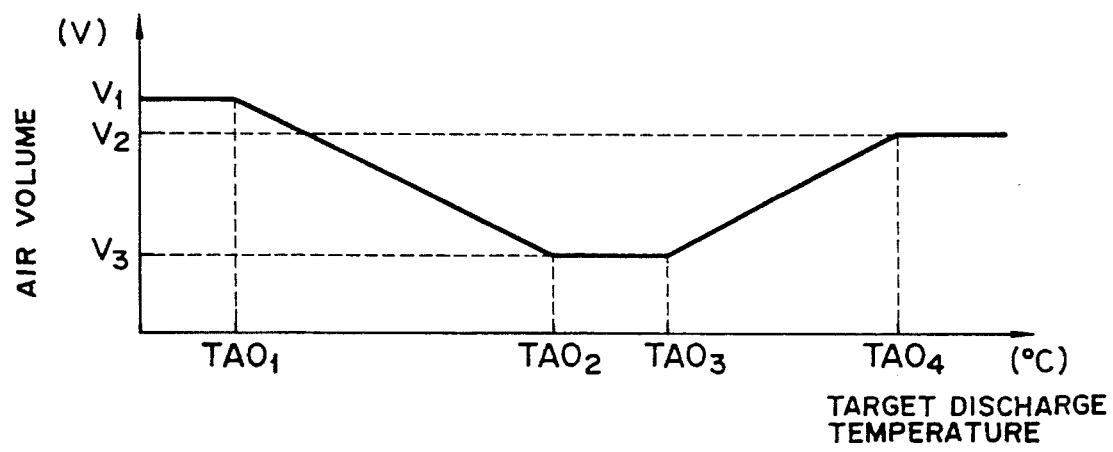
FIG. 5 is a graph showing a relationship between target discharge temperatures and volumes of discharge air in a conventional air conditioner.

Furthermore, it is preferred that, when a control mode of discharge that the defroster discharge port opening means opens at least the defroster discharge port 21, the minimum volume of discharge air is set greater than that of other modes. Namely, a conventional control of the volume of discharge air is performed, for example, as shown in FIG. 5. In FIG. 5, respective volumes $V_1$, $V_2$ and $V_3$ (represented by voltages applied to a motor fan for sending air) of discharge air are controlled in accordance with respective target discharge temperatures $TAO_1$, $TAO_2$, $TAO_3$ and $TAO_4$. $TAO_1$ corresponds to $V_1$, $TAO_2$ and $TAO_3$ correspond to $V_3$ and $TAO_4$ corresponds to $V_2$, and the relationships of $TAO_1 < TAO_2 < TAO_3 < TAO_4$ and $V_3 < V_2 < V_1$ exist. The respective "TAO"s are calculated based on the following equation.

$$TAO = Ks \cdot Ts - Kr \cdot Tr - Kam \cdot Tam - Krad \cdot Trad + C$$

In the above equation, "Ts" represents a temperature set by a user, "Tr" represents a temperature of inside air, "Tam" represents a temperature of outside air, "Trad" represents a value converted into a temperature value from an amount of solar radiation, "Ks" represents a set temperature factor, "Kr" represents an inside-air temperature factor, "Kam" represents an outside-air temperature factor, "Krad" represents a solar radiation factor and "C" represents a correction factor. These factors are selected as appropriate substantive values depending upon the size of the interior space, etc.

In such a control, the air volume decreases as the target discharge temperature increases from $TAO_1$ to $TAO_2$, the air volume becomes minimum between $TAO_2$ and $TAO_3$, and the air volume increases as the target discharge temperature increases from $TAO_3$ to $TAO_4$. Therefore, in a case where the target discharge temperature is present in the range of $TAO_2$ to $TAO_3$ and the control mode is a mode wherein the temperature-conditioned air is discharged from a defroster discharge port, the air volume is controlled at the minimum volume corresponding to the condition of $V_3$.

However, when the defroster discharge port is opened and cloud of moisture on the windshield is required to be removed, it is desired that the volume the discharge air is great for quick and sure removal of the moisture.

Figure 4:
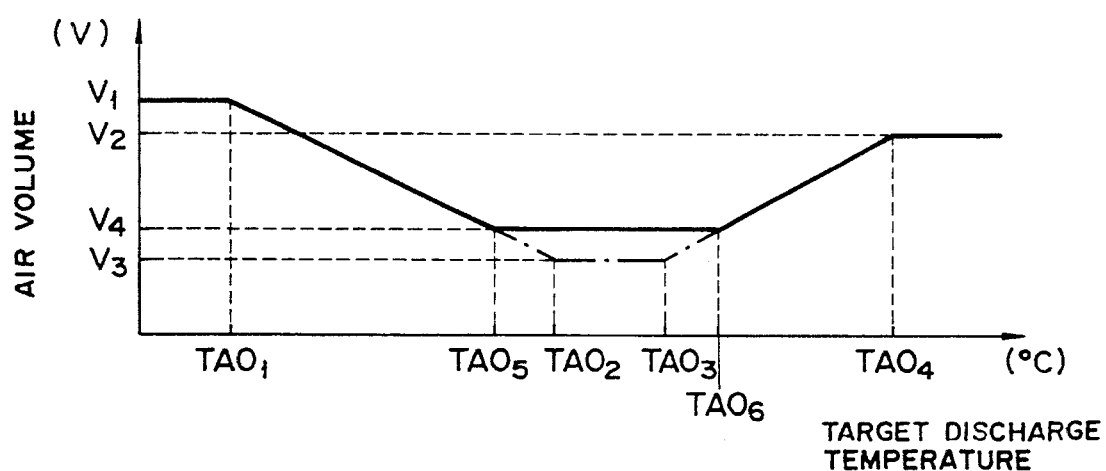
FIG. 4 is a graph showing a relationship between target discharge temperatures and volumes of discharge air in the air conditioner shown in FIG. 1.

Accordingly, the minimum air volume of a control mode opening at least defroster discharge port 21 is set greater than that of other modes. For example, as shown in FIG. 4, in such a control mode, the minimum volume of the discharge air is controlled to $V_4$ between the target discharge temperatures $TAO_5$ and $TAO_6$. The minimum volume of the discharge air in other control modes is controlled along the same curve as that in a conventional system shown in FIG. 5.

In such a control, when defroster discharge port 21 is opened, the moisture cloud on the windshield can be quickly and surely removed.

The present invention described hereinabove is not limited to the heat pump type air conditioner described in the above embodiment but is applicable to various air conditioners so long as they are air conditioners for vehicles capable of performing a dehumidifying operation such as dry cooling, dry heating and the like, and the same advantages can be obtained even in these air conditioners.

Although a preferred embodiment of the present invention has been described in detail herein, the invention is not limited thereto. It will be appreciated by those skilled in the art that various modifications may be made without materially departing from the novel and advantageous teachings of the invention. Accordingly, the embodiment disclosed herein is by way of example only. It is to be understood that the scope of the invention is not to be limited thereby, but is to be determined by the claims which follow.

What is claimed is:

1. An air conditioner for vehicles for operating in a dehumidifying-operation mode including at least one of either a dry-cooling or a dry-heating mode comprising:

a plurality of discharge ports including a defroster discharge port and discharge port switching means;

defroster discharge port opening means for opening at least said defroster discharge port for a predetermined time when said dehumidifying-operation mode is selected; and first discharge port return means for opening a non-defroster discharge port determined in accordance with an operation mode of said air conditioner and the like after said predetermined time has elapsed.

2. The air conditioner for vehicles according to claim 1 further comprising second discharge port return means for opening a non-defroster discharge port determined in accordance with an operation mode of said air conditioner and the like when said selected dehumidifying-operation mode is cancelled before said predetermined time elapses.

3. The air conditioner for vehicles according to claim 1 or 2 further comprising third discharge port return means for opening a non-defroster discharge port determined in accordance with a request issued when a discharge port other than said defroster discharge port is required before said predetermined time elapses.

4. The air conditioner for vehicles according to claim 1, wherein, when a control mode is selected that requires said defroster discharge port opening means to open at least said defroster discharge port, a minimum volume of discharge air is set greater than that of other air discharge port selection modes.

5. An air conditioner for vehicles having a dehumidifying-operation mode comprising:

a defroster discharge port and at least one non-defroster discharge port and discharge port switching damper means for said discharge ports;

means for opening at least said defroster discharge port for a predetermined time period when said dehumidifying-operation mode is selected; and means for opening a said non-defroster discharge port after said predetermined time has elapsed.

6. The air conditioner for vehicles according to claim 5, further comprising means for opening a said non-defroster discharge port determined in accordance with a selected operation mode upon cancellation of said selection of said dehumidifying-operation mode before said predetermined time elapses.

7. The air conditioner for vehicles according to claim 5, further comprising control means for increasing the volume of discharge air when said defroster discharge port is selected as compared with the volume of discharge air when only non-defroster discharge ports are selected.

* * * * *